US008331774B2

(12) United States Patent
Ko et al.

(10) Patent No.: US 8,331,774 B2
(45) **Date of Patent: *Dec. 11, 2012**

(54) FAN CONTROLLING CIRCUIT

(75) Inventors: Tin-Chen Ko, Taipei (TW); Po-Hsueh Huang, Taipei (TW)

(73) Assignee: Inventec Corporation, Taipei (TW)

( * ) Notice: Subject to any disclaimer, the term of this patent is extended or adjusted under 35 U.S.C. 154(b) by 714 days.

This patent is subject to a terminal disclaimer.

(21) Appl. No.: 12/423,190

(22) Filed: Apr. 14, 2009

(65) Prior Publication Data

US 2010/0127651 A1 May 27, 2010

(30) Foreign Application Priority Data

Nov. 27, 2008 (TW) ............................... 97146016 A

(51) Int. Cl.
*H02P 7/29* (2006.01)

(52) U.S. Cl. ......... 388/811; 388/800; 388/809; 388/812

(58) Field of Classification Search .................. 388/800, 388/809, 811, 812
See application file for complete search history.

(56) References Cited

U.S. PATENT DOCUMENTS

2003/0030486 A1* 2/2003 Noro et al. ...................... 330/10
2006/0191500 A1* 8/2006 Sugiyama et al. ......... 123/41.12
2007/0047929 A1* 3/2007 Hsieh ............................ 388/829
2007/0216458 A1* 9/2007 Chiu et al. .................... 327/175
2008/0238487 A1* 10/2008 Alberkrack et al. .............. 327/1
2008/0266912 A1* 10/2008 Cho ............................... 363/50

FOREIGN PATENT DOCUMENTS

TW I275240 3/2007
TW I279074 4/2007

* cited by examiner

*Primary Examiner* — Kawing Chan
(74) *Attorney, Agent, or Firm* — J.C. Patents

(57) ABSTRACT

A fan controlling circuit is provided. The fan controlling circuit includes an integral unit, an operational amplifier, a PMOS transistor, and an NMOS transistor. The integral unit transforms pulse width modulation (PWM) signals to voltages, and transmits the voltages to positive and negative input terminals of the operational amplifier. The PMOS transistor is coupled between a first PWM signal and an output terminal, and a gate of the PMOS transistor is coupled to an output of the operational amplifier. The NMOS transistor is coupled between a second PWM signal and the output terminal, and a gate of the NMOS transistor is coupled to the output of the operational amplifier. The fan controlling circuit may be formed by discrete elements and use a same voltage source as fans, so that the design cost and complexity are reduced.

4 Claims, 2 Drawing Sheets

110
112
114
VDD
R11
R13
R12
PWM1
N10
C10
GND
PWM2
PV1
PV2
120
P12
N12
OUT
PWM1/PWM2
100

FAN CONTROLLING CIRCUIT

CROSS-REFERENCE TO RELATED APPLICATION

This application claims the priority benefit of Taiwan application serial no. 97146016, filed Nov. 27, 2008. The entirety of the above-mentioned patent application is hereby incorporated by reference herein and made a part of this specification.

BACKGROUND OF THE INVENTION

1. Field of the Invention

The present invention generally relates to a fan controlling circuit, in particular, to a fan controlling circuit suitable for a server.

2. Description of Related Art

A server system usually has multiple sets of fans used for cooling. For a current computer system, fan controlling mainly performs the over temperature protection through an embedded controller (EC) on a mother board. The EC detects the temperature of the computer system, and adjusts an operation frequency of a pulse width modulation (PWM) signal according to the detected temperature, so as to control rotating speeds of system fans in the computer system to adjust the temperature.

A server system has multiple sets of thermal sensors to decide the rotating speeds of fans at different positions, for example, if two mother boards of a server share one fan board, the mother boards of the server provide different PWM signals to the corresponding fan board. In the conventional art, the different PWM signals are integrated by a micro-controller. The pulse width modulation signal having the highest operation frequency is used to drive all the fan boards.

However, the micro-controller is expensive. Further, the micro-controller uses a voltage different from that of the fans, so an additional voltage source needs to be provided to enable the micro-controller to operate, which not only makes the design more complicated, but also increases the design cost.

SUMMARY OF THE INVENTION

The present invention is directed to a fan controlling circuit, which transforms pulse width modulation (PWM) signals to voltages by an integral circuit, and then compares the voltages to output the PWM signal having a higher operation frequency to drive multiple sets of fans. As the fan controlling circuit may be formed by discrete elements and use a same voltage source as fans, the design cost and complexity may be reduced.

As embodied and broadly described herein, the present invention provides a fan controlling circuit, which is used to control rotating speeds of fans. The fan controlling circuit includes an integral unit, an operational amplifier, a PMOS transistor (p-channel metal oxide semiconductor field effect transistor, MOSFET) and an NMOS transistor (n-channel MOSFET). The integral unit receives a first PWM signal and a second PWM signal, and outputs a first voltage corresponding to an operation frequency of the first PWM signal and a second voltage corresponding to an operation frequency of the second PWM signal. The negative input terminal of the operational amplifier is coupled to the first voltage, and a positive input terminal of the operational amplifier is coupled to the second voltage so as to compare the first voltage and the second voltage. The drain of the PMOS transistor is coupled to the first PWM signal. The source of the PMOS transistor is coupled to an output terminal. The gate of the PMOS transistor is coupled to an output of the operational amplifier. The drain of the NMOS transistor is coupled to the second PWM signal. The source of the NMOS transistor is coupled to the output terminal. The gate of the NMOS transistor is coupled to the output of the operational amplifier.

In an embodiment of the present invention, the integral unit includes a first integral circuit and a second integral circuit. The first integral circuit is used to receive the first PWM signal and output the first voltage to the negative input terminal of the operational amplifier, while the second integral circuit is used to receive the second PWM signal and output the second voltage to the positive input terminal of the operational amplifier. The first circuit and the second circuit may use a same circuit structure.

In an embodiment of the present invention, the first integral circuit or the second integral circuit includes an NMOS transistor, a capacitor, and a plurality of resistors. A drain of the NMOS transistor is coupled to a first resistor. A source of the NMOS transistor is coupled to a ground terminal. A gate of the NMOS transistor is coupled to a second resistor. Another end of the second resistor is coupled to the first PWM signal. A third resistor and the capacitor are serially coupled between a voltage source and the ground terminal. Another end of the first resistor is coupled to a common node of the third resistor and the capacitor. The common node of the third resistor and the capacitor outputs the first voltage corresponding to the first PWM signal.

In an embodiment of the present invention, the first integral circuit or the second integral circuit may be implemented by using another circuit architecture. The architecture includes an NMOS transistor, a PNP transistor and resistors, capacitors. A drain of the NMOS transistor is coupled to a first resistor. A source of the NMOS transistor is coupled to a ground terminal. A gate of the NMOS transistor is coupled to a second resistor. Another end of the second resistor is coupled to the first PWM signal. An emitter of the PNP transistor (PNP bipolar junction transistor (BJT)) is coupled to a voltage source, a collector of the PNP transistor is coupled to a third resistor, and a base of the PNP transistor is coupled to another end of the first resistor. A fourth resistor and a capacitor are coupled in parallel between another end of the third resistor and the ground terminal. A common node of the third resistor and the fourth resistor outputs a voltage corresponding to the PWM signal.

Based on the above, the present invention uses circuits formed by discrete elements instead of expensive micro-controllers. A PWM signal having a relatively higher frequency may be selected according to the operation frequencies of the PWM signals to drive fans shared by mother boards of a server. In addition, the fan controlling circuit of the present invention may use the same operation voltage as the fans, so that the design complexity and design cost of the circuit may be simplified.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
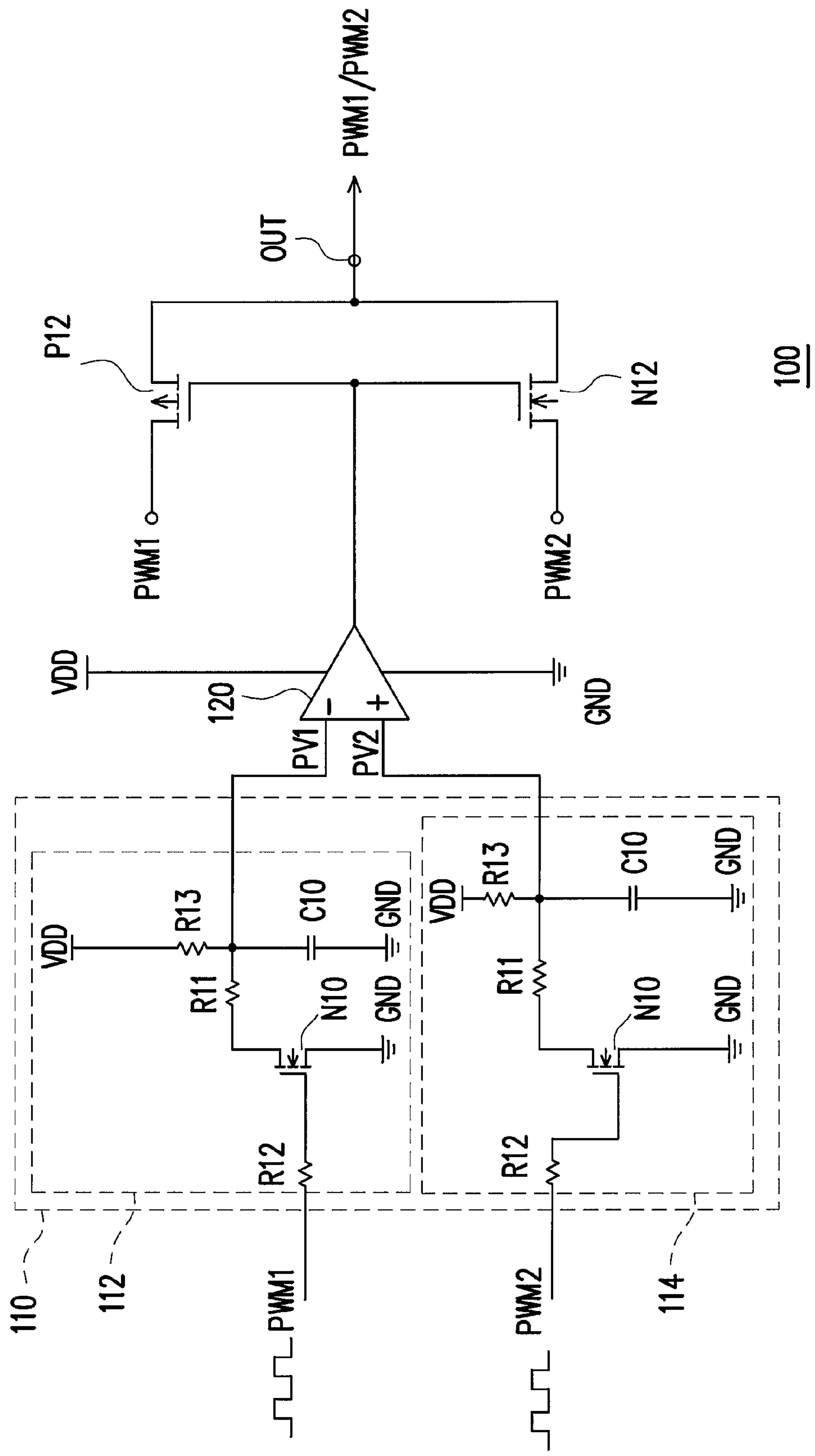
FIG. 1 is a circuit diagram of a fan controlling circuit according to a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

First Embodiment

FIG. 1 is a circuit diagram of a fan controlling circuit according to a first embodiment of the present invention. Referring to FIG. 1, a fan controlling circuit 100 includes an integral unit 110, an operational amplifier 120, a PMOS transistor P12 and an NMOS transistor N12. The integral unit 110 mainly transforms pulse width modulation (PWM) signals PWM1 and PWM2 to DC voltages PV1 and PV2 for comparison. An operational amplifier 120 is coupled between the integral unit 110, the PMOS transistor P12, and the NMOS transistor N12, so as to compare the DC voltages PV1 and PV2 to determine which operation frequency of the PWM signals PWM1 and PWM2 is higher. The gate of the PMOS transistor P12 and a gate of the NMOS transistor N12 are coupled to an output of the operational amplifier 120. The PMOS transistor P12 and the NMOS transistor N12 are turned on correspondingly according to the comparison result of the DC voltages PV1 and PV2 to output one of the PWM signals PWM1 and PWM2, so as to drive all the corresponding fan boards. The present invention may output PWM signals having higher or lower operation frequencies according to the design requirements. In this embodiment, outputting the PWM signal having the higher operation frequency is taken as an example for illustration.

The integral unit 110 includes two integral circuits 112 and 114, which have a same circuit structure. Taking the integral circuit 112 for example, the integral circuit 112 includes an NMOS transistor N10, resistors R11, R12 and R13, and a capacitor C10. The drain of the NMOS transistor N10 is coupled to the resistor R11. The source of the NMOS transistor N10 is coupled to a ground terminal GND. The gate of the NMOS transistor N10 is coupled to the resistor R12. Another end of the resistor R12 is then coupled to the PWM signal PWM1. The capacitor C10 and the resistor R13 are serially coupled between a voltage source VDD and the ground terminal GND. The capacitor C10 is coupled to the ground terminal GND. The resistor R13 is coupled to the voltage source VDD. A common node of the capacitor C10 and the resistor R13 is coupled to another end of the resistor R11, and is used to output the DC voltage PV1 to a negative input terminal of the operational amplifier 120. An integral circuit 114 has a same circuit structure as the integral circuit 112, so as to transform the PWM signal PWM2 to the DC voltage PV2, and output the direct current voltage PV2 to a positive input terminal of the operational amplifier 120.

Because the turn-on time of the NMOS transistor N10 is proportional to an operation frequency of the PWM signal PWM1, the voltage difference between the two terminals of the capacitor C10 (i.e., the direct current voltage PV1) will increase as the operation frequency of the PWM signal PWM1 increases. Similarly, the DC voltage PV2 will also increase as an operation frequency of the PWM signal PWM2 increases. When the DC voltage PV1 is higher than the DC voltage PV2 (indicating that the operation frequency of the PWM signal PWM1 is higher than that of the PWM signal PWM2), the output of the operational amplifier 120 is at a low potential (ground level), and thus the PMOS transistor P12 will be turned on to output the PWM signal PWM1. When the DC voltage PV1 is lower than the DC voltage PV2 (indicating that the operation frequency of the PWM signal PWM1 is lower than that of the PWM signal PWM2), the output of the operational amplifier 120 is at a high potential, and thus the NMOS transistor N12 will be turned on to output the PWM signal PWM2.

In other words, the fan controlling circuit 100 according to this embodiment may selectively output the PWM signal PWM1 or PWM2 having a higher operation frequency to all fans, so as to drive all the fans to rotate at a relatively higher speed with the PWM signal. The fan controlling circuit 100 may replace the micro-controller in the conventional art for determining which PWM signal is to be output. Moreover, it should be noted that the fan controlling circuit 100 may use the same voltage source VDD as the fans, for example, 12 V, and therefore the voltage source of the fan controlling circuit 100 does not need to be designed otherwise, which may reduce the complexity and the cost of the design.

Second Embodiment

Figure 2:
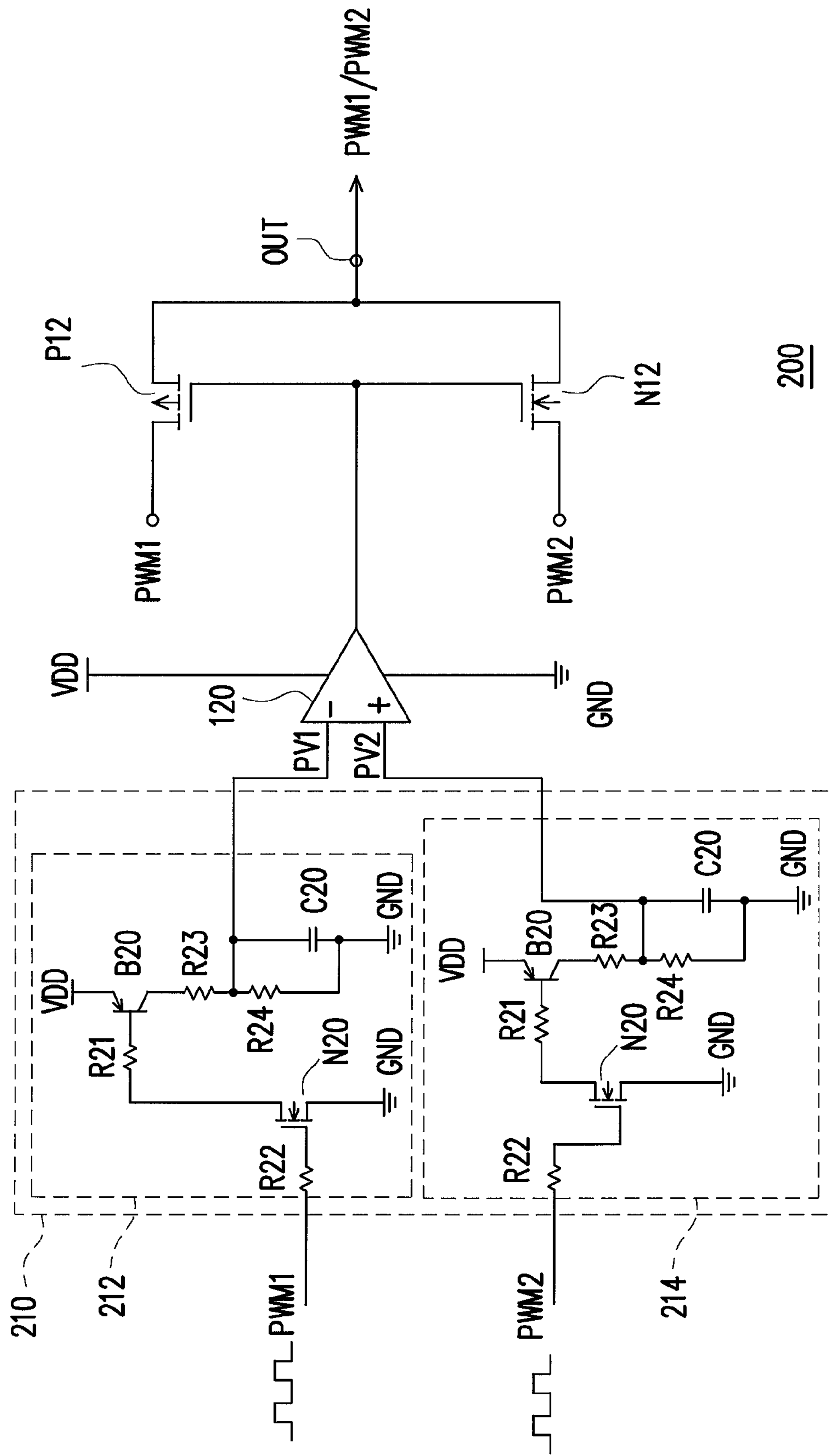
FIG. 2 is a circuit diagram of a fan controlling circuit according to a second embodiment of the present invention.

In order to enhance the voltage transformation characteristics of the integral unit 110, the integral circuits 112 and 114 in the integral unit 110 may be different. FIG. 2 is a circuit diagram of a fan controlling circuit according to a second embodiment of the present invention. Referring to FIG. 2, a main difference between the fan controlling circuit 200 and the fan controlling circuit 100 lies in the integral unit 210. The integral unit 210 is also formed by two integral circuits 212 and 214 having the same circuit structure. The integral circuit 212 is coupled between a negative input terminal of the operational amplifier 120 and the PWM signal PWM1, and is used to transform the PWM signal PWM1 to the DC voltage PV1. The integral circuit 214 is coupled between the positive input terminal of the operational amplifier 120 and the PWM signal PWM2, and is used to transform the PWM signal PWM2 to the DC voltage PV2.

The integral circuit 212 includes an NMOS transistor N20, a PNP transistor B20, resistors R21, R22, R23 and R24, and a capacitor C20. The drain of the NMOS transistor N20 is coupled to the resistor R21. The source of the NMOS transistor N20 is coupled to the ground terminal GND. The gate of the NMOS transistor N20 is coupled to the resistor R22. Another end of the resistor R22 is coupled to the PWM signal PWM1. The emitter of the PNP transistor B20 is coupled to the voltage source VDD. The collector of the PNP transistor B20 is coupled to the resistor R23. The base of the PNP transistor B20 is coupled to another end of the resistor R21. The resistor R24 and the capacitor C20 are coupled in parallel between another end of the resistor R23 and the ground terminal GND. A common node of the resistor R23 and the resistor R24 outputs the DC voltage PV1. Referring to FIG. 2, the circuit structure of the integral circuit 214 is the same as the integral circuit 212, and will not be described again here. It should be noted that although the integral circuit 214 and the integral circuit 212 in this embodiment have the same circuit structure, if a user has special requirements in the design, a different circuit structure may be used, which is not limited in this embodiment.

It should be noted that in this embodiment, the capacitor C20 is charged only when the NMOS transistor N20 is turned on, so the DC voltages PV1 and PV2 will increase as the operation frequencies of the PWM signals PWM1 and PWM2 increase. The fan controlling circuit 200 will output PWM signal having a higher operation frequency to drive fans at the rear end. To output the PWM signal having a lower operation frequency, the user just needs to swap the terminals receiving PWM signals correspondingly.

The transistors (including NMOS, PMOS, and BJT) described in the above embodiments mainly function as switches. Therefore the present invention is not limited to the circuit architecture or elements used in FIGS. 1 and 2. Similarly, the integral circuits mainly transform the PWM signals to DC voltages for comparison. The output unit mainly selects the PWM signal to output according to the comparison result. Persons skilled in the art can easily derive other feasible circuits from the disclosure of the present invention, which will not be described here.

In conclusion, the present invention replaces conventional micro-controllers by discrete circuits, such that the fan controlling circuit and the rear-end fans may use the same voltage source, which reduces the circuit design cost, and lowers the design complexity of the fan controlling circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fan controlling circuit, for controlling a rotating speed of fans, comprising:

an integral unit, for receiving a first pulse width modulation (PWM) signal and a second PWM signal, and outputting a first voltage corresponding to an operation frequency of the first PWM signal and a second voltage corresponding to an operation frequency of the second PWM signal, wherein the integral unit comprises a first integral circuit for receiving the first PWM signal and outputting the first voltage to the negative input terminal of the operational amplifier, the first integral circuit comprising:

an NMOS transistor, wherein a drain of the NMOS transistor is coupled to a first resistor, a source of the NMOS transistor is coupled to a ground terminal, and a gate of the NMOS transistor is coupled to a second resistor, and another end of the second resistor is coupled to the first PWM signal; and a third resistor, serially connected to a capacitor, and another end of the third resistor coupled to a voltage source, wherein another end of the capacitor is coupled to the ground terminal, and another end of the first resistor is coupled to a common node of the third resistor and the capacitor, wherein the common node of the third resistor and the capacitor outputs the first voltage;

an operational amplifier, wherein a negative input terminal of the operational amplifier is coupled to the first voltage, and a positive input terminal of the operational amplifier is coupled to the second voltage;

a p-channel metal-oxide-semiconductor (PMOS) transistor, wherein a drain of the PMOS transistor is coupled to the first PWM signal, a source of the PMOS transistor is coupled to an output terminal, and a gate of the PMOS transistor is coupled to an output of the operational amplifier; and an n-channel metal-oxide-semiconductor (NMOS) transistor, wherein a drain of the NMOS transistor is coupled to the second PWM signal, a source of the NMOS transistor is coupled to the output terminal, and a gate of the NMOS transistor is coupled to the output of the operational amplifier.

2. The fan controlling circuit according to claim 1, wherein the integral unit comprises:

a second integral circuit, for receiving the second PWM signal and outputting the second voltage to the positive input terminal of the operational amplifier.

3. A fan controlling circuit, for controlling a rotating speed of fans, comprising:

an integral unit, for receiving a first pulse width modulation (PWM) signal and a second PWM signal, and outputting a first voltage corresponding to an operation frequency of the first PWM signal and a second voltage corresponding to an operation frequency of the second PWM signal, wherein the integral unit comprises a second integral circuit for receiving the second PWM signal and outputting the second voltage to the positive input terminal of the operational amplifier, wherein the second integral circuit comprising:

an NMOS transistor, wherein a drain of the NMOS transistor is coupled to a first resistor, a source of the NMOS transistor is coupled to a ground terminal, a gate of the NMOS transistor is coupled to a second resistor, and another end of the second resistor is coupled to the second PWM signal; and a third resistor, serially connected to a capacitor, and another end of the third resistor coupled to a voltage source, wherein another end of the capacitor is coupled to the ground terminal, and another end of the first resistor is coupled to a common node of the third resistor and the capacitor;

wherein the common node of the third resistor and the capacitor outputs the second voltage;

an operational amplifier, wherein a negative input terminal of the operational amplifier is coupled to the first voltage, and a positive input terminal of the operational amplifier is coupled to the second voltage;

a p-channel metal-oxide-semiconductor (PMOS) transistor, wherein a drain of the PMOS transistor is coupled to the first PWM signal, a source of the PMOS transistor is coupled to an output terminal, and a gate of the PMOS transistor is coupled to an output of the operational amplifier; and an n-channel metal-oxide-semiconductor (NMOS) transistor, wherein a drain of the NMOS transistor is coupled to the second PWM signal, a source of the NMOS transistor is coupled to the output terminal, and a gate of the NMOS transistor is coupled to the output of the operational amplifier.

4. The fan controlling circuit according to claim 3, wherein the integral unit comprises:

a first integral circuit, for receiving the first PWM signal and outputting the first voltage to the negative input terminal of the operational amplifier.

* * * * *